United States Patent [19]

Baus

[11] Patent Number: 4,628,195
[45] Date of Patent: Dec. 9, 1986

[54] CREDIT CARD SECURITY SYSTEM

[75] Inventor: Rene Baus, Rancho Palos Verdes, Calif.

[73] Assignee: American Magnetics Corporation, Carson, Calif.

[21] Appl. No.: 588,048

[22] Filed: Mar. 9, 1984

[51] Int. Cl.⁴ .............................................. G06K 7/00
[52] U.S. Cl. ................................... 235/440; 235/448; 235/474
[58] Field of Search ............... 235/380, 440, 448, 454, 235/474, 435; 340/686

[56] References Cited

U.S. PATENT DOCUMENTS

| | | | |
|---|---|---|---|
| 3,671,720 | 6/1972 | White et al. | 235/440 |
| 3,854,661 | 12/1974 | Weber et al. | 235/448 |
| 4,013,894 | 3/1977 | Foote et al. | 235/380 X |
| 4,029,944 | 6/1977 | Trenkamp | 235/440 |
| 4,041,279 | 8/1977 | Foote | 235/440 |

*Primary Examiner*—David L. Trafton
*Attorney, Agent, or Firm*—Marmorek, Guttman & Rubenstein

[57] ABSTRACT

A credit card security system includes a system to generate a security code number determined by the spatial positions of corresponding data in two different forms of encoded data on the card. The system generates the security code number each time a card is used and compares it to a stored security number generated in the same way when the card was first encoded or previously used. The system is described in terms of a card having a familiar magnetic stripe and embossed character encoding, and apparatus for sensing the embossed characters is disclosed.

12 Claims, 10 Drawing Figures

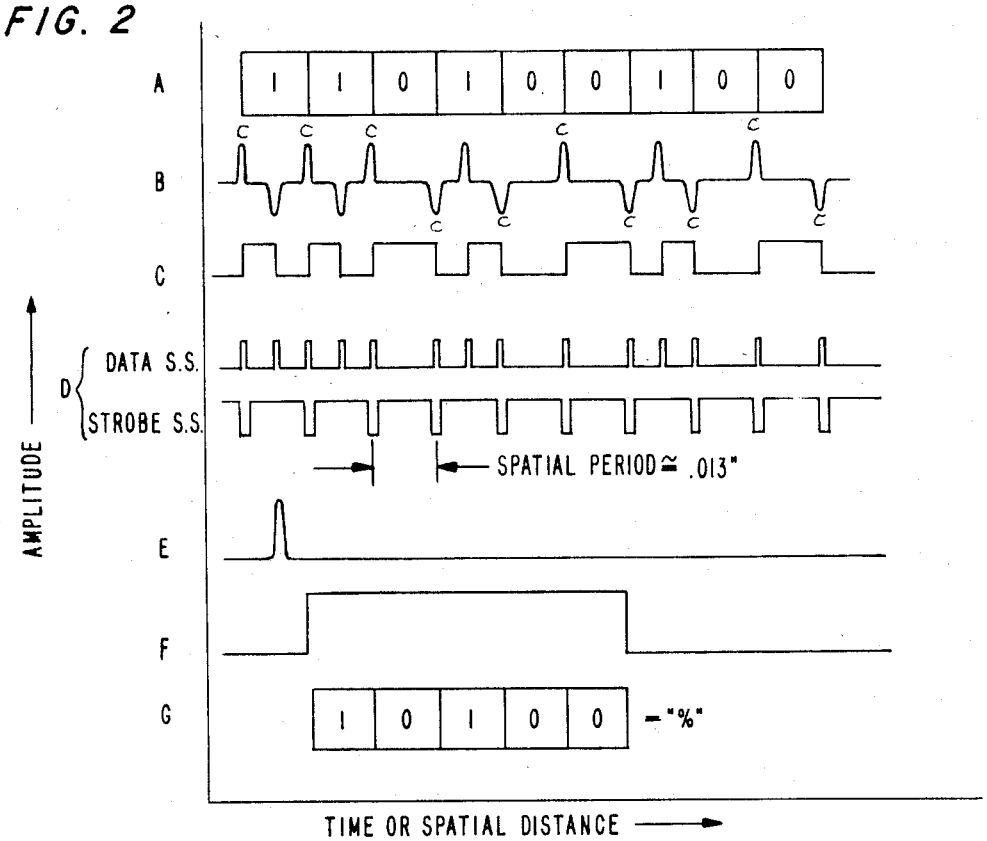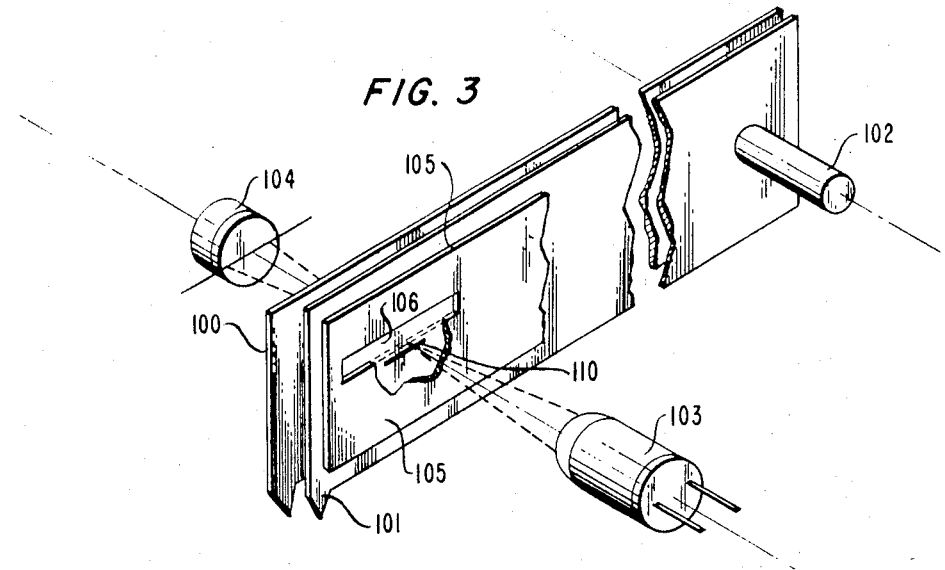

CREDIT CARD SECURITY SYSTEM

FIELD OF THE INVENTION

This invention relates to a system for detecting counterfeit credit cards and, more particularly, to such systems useful for detecting counterfeit credit cards which have two separately coded sets of data thereon.

BACKGROUND OF THE INVENTION

Most credit cards in use today have information coded on a magnetic stripe as well as in embossed characters. The information so coded is not altered for the life of the card. Such cards are referred to as "magnetic stripe" cards.

In most credit systems that use magnetic stripe cards and most particularly in the burgeoning field of electronic funds transfer systems (hereafter called EFTS), great concern exists over the lack of security associated with the magnetic stripe credit card that is used as one of the key inputs of information for identification and credi purposes. Cards can be counterfeited and the magnetic stripe information they contain can be duplicated with ease. Lack of security has hindered the acceptance of such magnetic stripe cards in EFTS.

Several companies have developed special credit cards with improved security. Transaction Technology (a subsidiary of First National City Bank) has developed its "Citicard" which contains optical information embedded in the card structure; the card is read by means of infrared sources and photodetector arrays. Burroughs has developed a magnetic stripe card that contains permanent security information in an auxiliary magnetic stripe. Zeta (a small California company) has developed a card with embedded magnetic information. Rusco Industries has developed a security access card which also contains hidden magnetic information. Several years ago Addressograph-Multigraph Corporation announced a new system that contains secret optical (reflector) bits that are read with infrared light. All of these cards doubtless improve security; they strain the skill of the counterfeiter and require that he expend considerable money for the equipment necessary to the achievement of his scheme. Recognizing that any card can be counterfeited, the companies cited above and the users of their systems hope that the high cost of counterfeiting their cards will act as a deterrent.

There are four salient disadvantages to these approaches: first, the security credit cards are more costly to produce and distribute; second, the terminal readers for these cards are significantly more expensive than magnetic stripe readers; third, these cards inherently contain less information than the standard three channel magnetic stripe. Fourth and most important, large costs are required to replace existing cards with the new security cards. For companies such as American Express and BankAmericard, with millions of magnetic stripe cards issued, the replacement costs are enormous. Clearly, the need to replace existing cards is a barrier to wide use of these new security cards.

A system in accordance with the principles of this invention is applicable to any magnetic stripe card terminal system. In general such a system consists of a group of terminals, a central computer, several intermediate minicomputer controllers and dedicated phone lines. These systems work as follows: a customer presents his credit card to the terminal operator for the purpose of effecting some financial transaction—check cashing, charge, fund transfer, bill payment, etc.; certain information is keyed into the terminal and the credit card is read by the terminal; this information is gathered from the terminal by the controller and transmitted to the central computer where (among other operations) the status of the customer's credit is obtained from the computer memory and a code is transmitted back to the terminal instructing the operator as to whether or not he should allow the requested transaction to take place. If the credit card is valid—i.e., not on a "derog" list of stolen cards, over limit, or overdue accounts—the transaction proceeds, and the results are recorded in the central memory. Present systems make only a superficial attempt (e.g., by means of parity checks) to determine whether or not a magnetic stripe has been altered; no attempt is made to catch a counterfeit card. An altered card (or a counterfeit card) that contains a proper parity code would fool many systems.

BRIEF DESCRIPTION OF THE INVENTION

The present invention is based on the realization that whenever a magnetic stripe card is encoded, magnetically or by embossed characters, the positions of the encoded data vary in a unique way for that card. Consequently, when a card is encoded by two distinct encoding techniques, the relative positions of the data in one code vary uniquely with respect to the data in the other code.

A code is generated, in accordance with the principles of this invention, to provide a security number which characterizes the relative positions of the characters of the two codes. That security number is unique to a given card, and is preferably generated and stored when the card is made. Any counterfeit card with the same data encoded on it would not produce the same security number. Consequently, a counterfeit card would be detected by a system which stores the security number *when the original card is made.* The system is operative to check the security number read from such a card whenever the card is used and to check that number against the security number which was stored when that card was made. The terminal operator may be alerted to the counterfeit status of the card in order to take the appropriate action.

In one embodiment, the system includes a credit card reader designed to read the key portions of embossed characters of a card, as for example, the vertical lines of the character, as well as the magnetic code on a card submitted to an operator at a point of sale terminal. The credit card reader generates a security number determined by a comparison of the positions of the selected portions of the character and the magnetic card information, unique to the card in use, for comparison with the security number previously stored in the system for that card. It is clear that the present system has the overwhelming advantage of not requiring the replacement of existing cards.

BRIEF DESCRIPTION OF THE DRAWINGS

FIG. 2 shows a diagram of the pulses representing phase positional data of the present invention.

FIGS. 3, 4, 5, and 6 show portions of an optomechanical detector for generating pulses representative of optical or embossed characters on a card.

DETAILED DESCRIPTION

Figure 1:
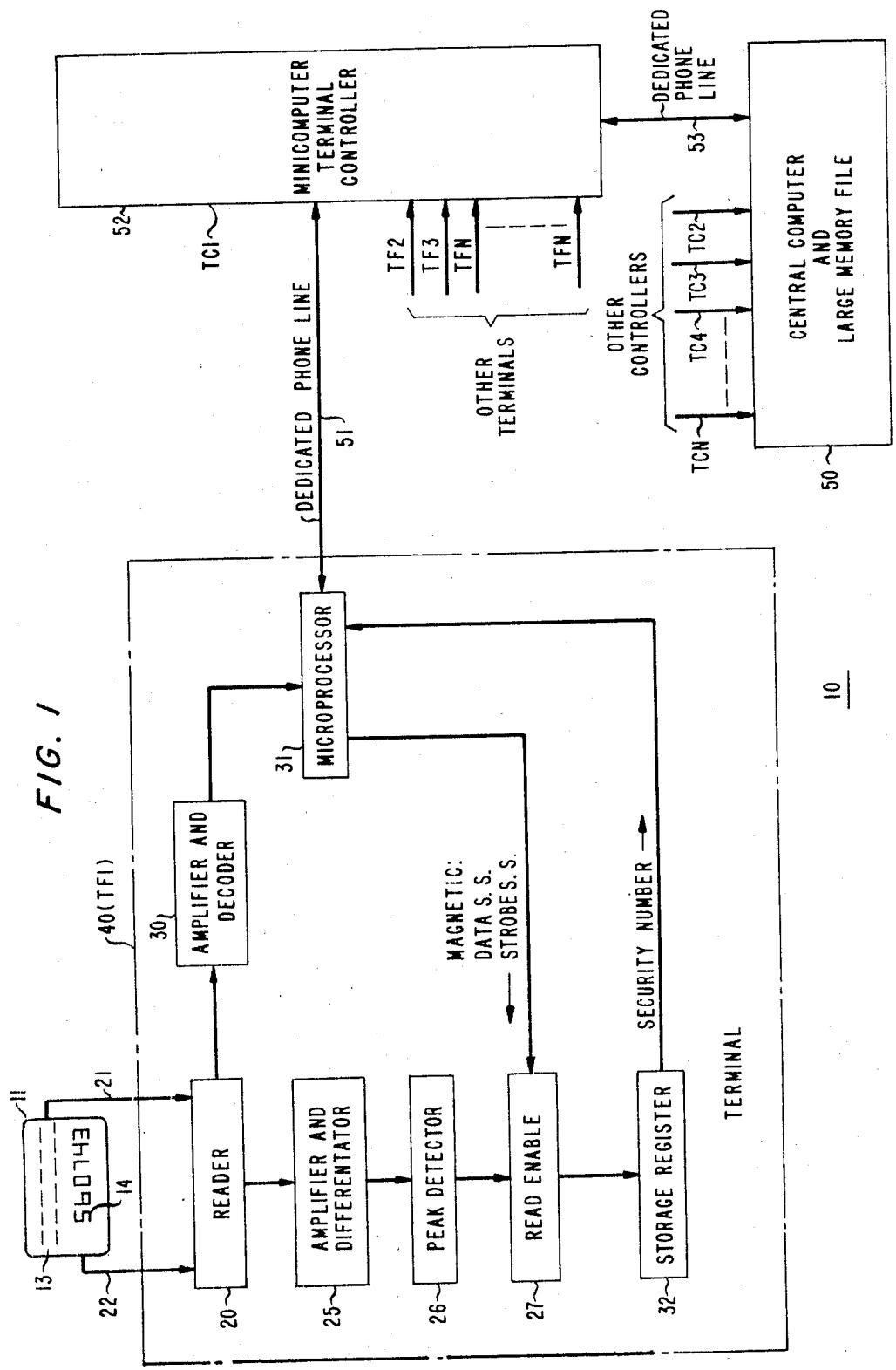
FIG. 1 shows a block diagram of a card security system in accordance with the principle of the present invention.

FIG. 1 shows a credit card security system 10 operative with a ubiquitous magnetic stripe card 11. The card is assumed to have identification data encoded magnetically in magnetic stripe 13 and data written as embossed characters at 14.

The data in both magnetic and embossed form are detected by a credit card reader 20 over magnetic stripe information channel 21 and embossed character information channel 22. A first output of the reader is connected to the input of amplifier and differentiator circuit 25. The output of circuit 25 is connected to the input of peak detector 26. The output of the peak detector is applied as a first input to read enable circuit 27. Circuits 25, 26 and 27 are responsive to optical signals generated by an optical sensor, assumed, for the moment, to be included in reader 20. Suitable optical sensors will be discussed fully hereinafter.

A second output of reader 20 is connected to the input of amplifier and decoder circuit 30. The output of circuit 30 is connected to a first input of microprocessor 31. An output of microprocessor 31 is connected as a second input to read enable circuit 27. The output of circuit 27 is connected to storage register 32. The output of register 32 is connected to a second input to microprocessor 31.

The system of FIG. 1, in general, is operative as two subsystems to respond to optical signals detected in channel 22 utilizing circuits 25, 26 and 27 and to respond to magnetic signals in channel 21 utilizing circuit 30, microprocessor 31 and circuit 27. A positive signal from each of the optical and magnetic subsystems simultaneously enables circuit 27 to activate register 32 to store the security number generated from the phase (positional) relationship between the two forms of identification information on the credit card at the reader. It is assumed, for the moment, that all credit card readers in the present system are designed and constructed to preserve the phase relationship between the magnetic and optical signals in channels 21 and 22 respectively. Detection arrangements for preserving the phase relationships are discussed hereinafter.

The system as described up to this point is physically located at a terminal, which may be a point of sale terminal. In any case, that portion of the system is self contained, as indicated by broken block 40 in FIG. 1 representing terminal facility number one (TF1). Many such systems are presumed to be connected by means of dedicated telephone lines or by other communication links to a central computer facility, where all security numbers are stored with other customer identification information.

FIG. 1 shows a central computer and memory file as block 50. One representative local terminal facility encompassed by broken block 40 is connected to the central computer via a dedicated phone line indicated at 51 and a terminal controller-minicomputer represented by block 52. The terminal controller may be located remotely from the central computer, in which case interconnection therebetween is accomplished by a dedicated telephone line represented at 53. Controller 52, of course, would be connected similarly to the other terminal facilities TF2, TF3—TFN as indicated by the arrows so designated in FIG. 1. In turn, the central computer is interconnected with many controllers such as 52 (terminal controller number one - TC1) as indicated by arrows TC2, TC3, TC4,—TCN in FIG. 1.

We will now discuss the operation of terminal facility number one in terms of the pulse diagram of FIG. 2. We will assume arbitrarily that a data sequence 110100100 is magnetically encoded on a credit card 11 of FIG. 1 and detected by reader 20. This data sequence is shown in line A of FIG. 2. The magnetic flux changes at a magnetic pick up head included within reader 20 produce a sequence of pulses shown in line B of FIG. 2.

The magnetic code on a credit card (the so-called "Biphase Recording" or Aiken Code) is a self clocking code, in which a flux change occurs at the beginning and end of each interval and serves as a clock pulse. A further flux change at the center of such an interval denotes a binary one; the absence of such a further flux change denotes a binary zero. Line B of FIG. 2 includes regular sequence of pulses corresponding to the end points of the intervals in which are encoded the binary representation in line A. Such pulses define a clock interval for decoding the data. Line B also includes an irregular sequence of pulses between the clock pulses, occurring whenever a binary one occurs in the pertinent interval. It will be seen that the clock pulses in this example (marked with a "C") change polarity at the end of the interval (from the polarity at the beginning of such interval) only when a zero is present over the interval.

The magnetic head output (line B) is amplified and decoded by circuit 30 of FIG. 1 into two signal trains, a data stream and a strobe, indicated by the upper and lower lines of D respectively of FIG. 2. (Line C shows an intermediate signal representative of the wave form of line B after it has passed through a zero crossing detector.) Operation of a detection circuit for a credit card reader in this manner is disclosed in U.S. Pat. No. 3,949,193 of Edward F. Dowdell, issued Apr. 6, 1976. Dowdell shows a method of deriving the binary data from an Aiken-coded magnetic stripe using such data and strobe signals.

The optical head output, from an illustrative optical head to be described hereinafter, produces a signal peak, as indicated in line E of FIG. 2, as the optical head passes over the vertical bar of an embossed character. This peak is used as a timing signal to open the read-enable gate 27 for a period represented by the high signal shown at line F of FIG. 2.

The signals from line D and E are applied to the input of 27 as shown in FIG. 1. Circuit 27 is operative as a coincidence detector that opens a gate (window) to allow the magnetic data of line D to flow into register 32. Once the peak of the signal of line E has occurred, the circuit 27 voltage (line F) rises simultaneously with the next rise of the strobe. The voltage continues at a high level until an arbitrary five strobe pulses occur, thus allowing five binary bits to enter register 32. Thereafter, the voltage on line F returns to zero, disabling data flow into the register.

Thus, each time the optical head in reader 20 detects a vertical bar on an embossed character on card 11, the storage register records a five bit character. The particular character depends on the phase relationship between the optical and magnetic data. The familiar ANS (American National Standard) coded character set for data transmission and interchange includes a set of characters represented by five bit codes.

The security character stored in register 32, shown in line G of FIG. 2 to be 10100, corresponds to an asterisk as is seen in that set. If the security character were 10010, the character would correspond to a ")" sign also included in that set. In other words, a shift in the phase relationship by an amount greater than one bit space (the space required to encode one bit, approximately 0.013 inch) may generate a different character in the register.

Once the storage register is filled, the character is transferred to the memory of microprocessor 31 and the register is cleared to await the arrival of the next character corresponding to the detection of a subsequent vertical bar in the embossed characters. Thus, a sequence of characters that constitute the security number is generated and held in the memory of microprocessor 31. Upon command of minicomputer 52, the number is transmitted (along with other frame data) to central computer 50 where it is compared to the security number stored there when card 11 was made.

An opto-mechanical sensor for determining the positions of the vertical bars in the set of embossed characters is shown in FIG. 3. It consists of two fingers, 100 and 101, which are free to rotate in a vertical plane about a common pivot 102. The sensor also includes a light source 103, a photodetector 104, and a mask 105 with aperture 106. Although not shown on the drawing, springs are provided to individually load both fingers downward, and mechanical stops are provided to limit the downward motion of both fingers such that both finger styluses are prevented from touching the card surface except in the neighborhoods of the embossed characters.

Figure 4:
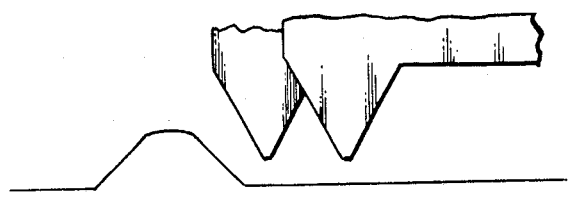
Figure 5:
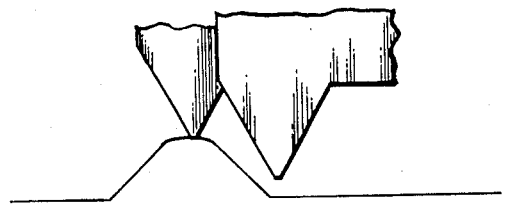
Figure 6:
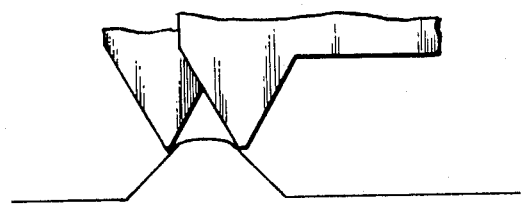

Each finger contains a slit (only the following finger slit 110 is shown in the drawing). When both fingers are down, their slits may be aligned but the light flux is blocked by mask 105. However, when both fingers are raised to exactly the same height by an embossed character the slits are in line and within the mask aperture 106. Under such circumstances light flux passes from the light source 103 to the photodetector 104, thereby providing an electrical pulse (see waveform E of FIG. 2) that opens the read enable gate (waveform F). The operational principle of the two fingers is shown in FIG. 4, 5 and 6 in which the positions of the two fingers are shown in relation to the surface profile of a vertical bar of an embossed character 140. It is seen that coincidence of the two slits occur during a time when the leading finger is moving up and the following finger is moving down. This conclusion is clear from the figures, particularly FIG. 6. The three figures show the leading and following fingers in varying positions with respect to an advancing embossed character. In FIG. 4 both fingers are in normal positions. No light passes because both slits (i.e. 110 of FIG. 3) are below mask aperture 106.

In FIG. 5, the leading finger encounters the embossed character and is raised. While the slit of the leading finger will then be aligned with the aperture 106, the slit of the following finger will remain below the level of the aperture, and light is blocked by the following finger in this case. In FIG. 6, both fingers are raised the same distance and their slits are aligned with aperture 106. Consequently, light passes to photodetector 104 only under the condition of FIG. 6.

Figure 7:
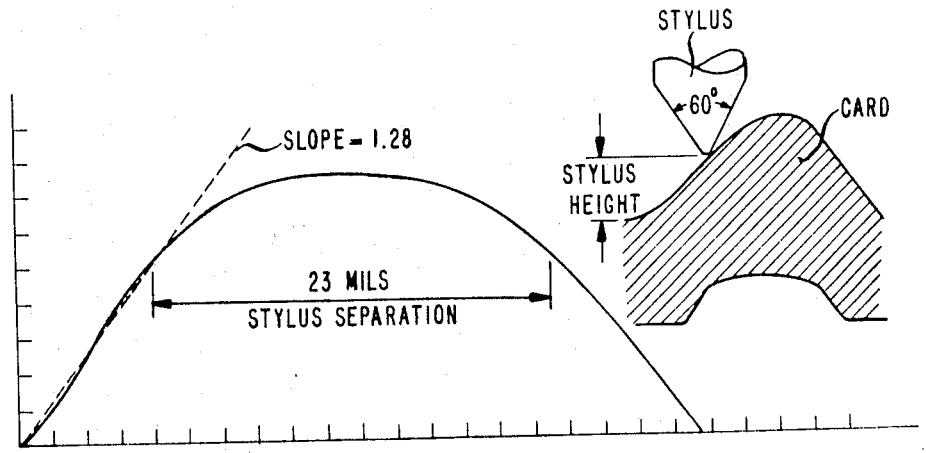
FIG. 7 shows a representative output of the detector of FIG. 3 when scanning a card.

Note that for any embossed character, there is always some position for which the slits will be aligned and within the aperture mask provided that the separation of the two finger styluses is less than the width of the bars of the embossed character, and provided that the embossed character height is sufficient to raise both slits above the bottom limit of the mask aperture. FIG. 7 shows a typical scan of an American Express card character with a 60° stylus. It is clear from this figure that the finger slits would be aligned for some position of the embossed character provided that the stylus separation is less than 0.04 inch (the base length of the character).

In FIG. 7, a 23 Mil stylus separation is indicated. Such a separation would allow the same sensor to be used with American Express, BankAmericard, and Master Charge. The embossed character cross sections are about the same for all three cards, all three cards conform to the appropriate ANSI specification, and all are intended to produce the same printed characters on a sales slip in order that it can be read by a standard optical character reader. This fortunate circumstance allows a single design of a security reader to be used with all three cards.

The position sensing accuracy of this scheme can be estimated by assuming that the two finger slits have widths of 0.001 inch and that the scanning slope at coincidence is 1.28. Then, it can be shown that the output waveform of the sensor is a triangle with a base corresponding to 0.00078 inch of card movement. Since the waveform is well defined, the center of the pulse can be determined with great accuracy—a sensitivity of ±0.0001 inch appears reasonable, and is more accurate than is necessary to generate the phase position code of the present invention dependably.

One of the advantages of this sensor is that it can be manufactured with high precision at low cost. The fingers can be produced by photodetecting or by precision stamping to tolerances measured in millionths of an inch—finger pairs used in all of the different readers would be exactly alike.

From the standpoint of improving security, it may be desirable to design the two fingers such that at the time of slit coincidence one is riding higher on the embossed character than the other one. This could be accomplished by having a different distance between the slit and the stylus on each of the two fingers. If these distances are the same on both fingers, the sensor determines the position of symmetry in the cross section of the embossed character. In the latter case, a counterfeiter would be required to duplicate precisely the exact curvature of the perimeter of the character cross-section—a very difficult task.

Even if a damaged card is used, the leading and following fingers, in FIG. 7, at the time the slits are coincident, are riding on the two sides of an embossed character rather than its top. The sides are far less susceptible to damage than the top, which, among other things, may be subjected to pressure and coated with ink when it is used to print information on the sales slips in some imprinters. Consequently, the system is quite tolerant of damaged cards.

In order to further protect the system against dirt and card damage, the sensor could be designed to scan the back, rather than the front of the card; in other words to detect the position of the indentations on the back that are produced when the card is embossed. In both front and back side scanning, the position accuracy is unaffected by the absolute height of the embossed character; it depends only on the cross sectional profile of the character. The sensor is insensitive to warpage of the card.

Finally, it should be mentioned that this sensor should be insensitive to electrical and mechanical noise. Although the slit widths on the two fingers are only, say, 0.001 inch, the lengths can be as is large as needed to pass a sufficient quantity of light to generate a well defined signal, say ¼ inch. Thus, the light flux signal on the photodetector can be made much greater than the noise from all sources. Furthermore, since the fingers are light weight, the resonant system that is composed of the fingers and their springs can be designed to have a high natural resonant frequency (say greater than 1 KHz), and to be critically damped. Thus, it is possible to isolate the finger support from extraneous sources of mechanical vibration.

Figure 8:
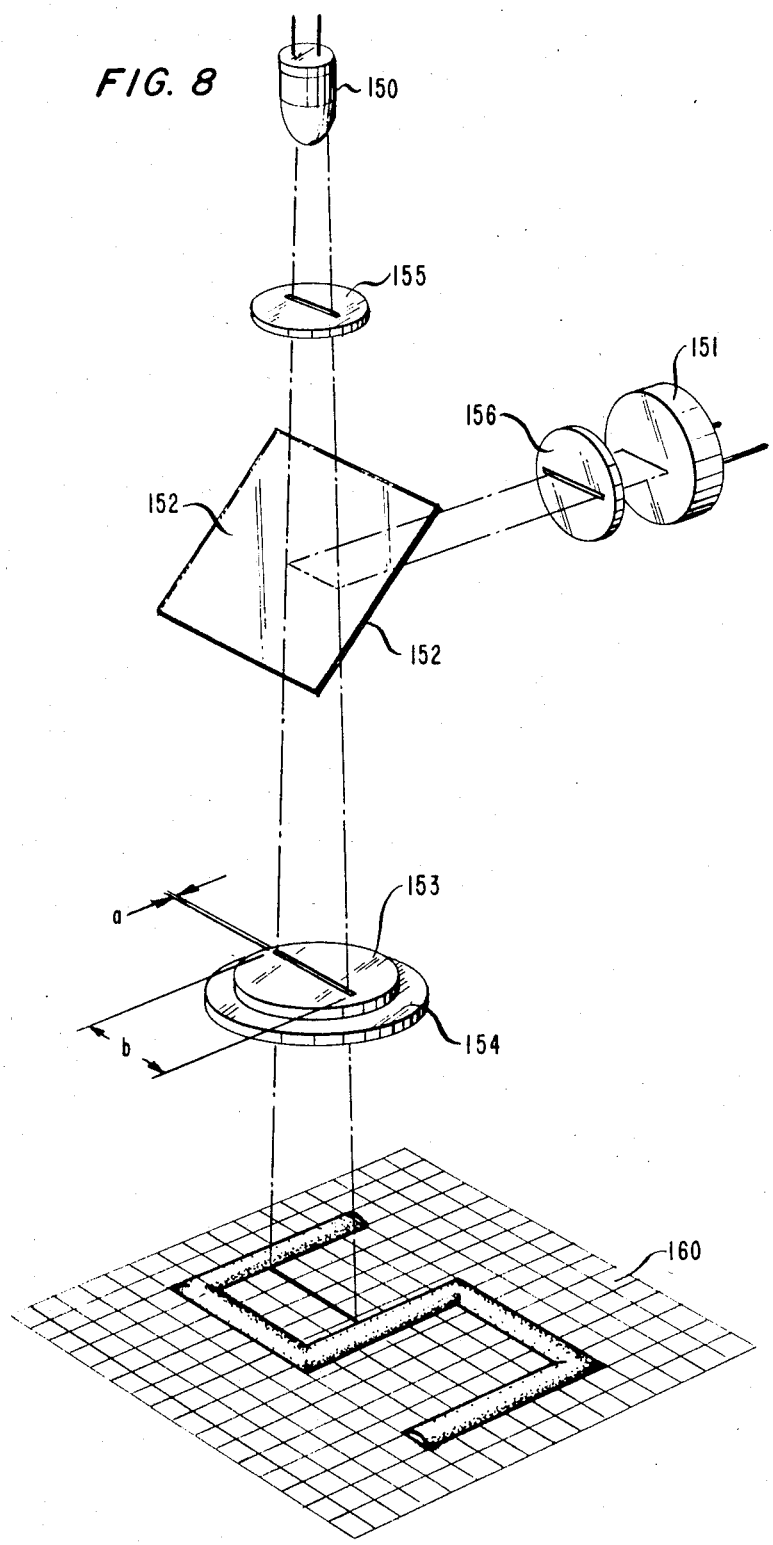
FIGS. 8, 9 and 10 show an alternative optical character detector for use in the system of FIG. 1.

FIG. 8 shows a purely optical sensor for determining the positions of the vertical bars in the set of embossed characters. As was the case with the opto-mechanical sensor of FIG. 3, it can be used for scanning either the front or the back of the card. It provides a timing signal whenever the curvature of the card changes along the scan line.

As shown in FIG. 8, this sensor consists of a light source 150, a photo detector 151, a beam splitter 152, a lens 153, and a rectangular aperture 154. For the purpose of illustration, auxiliary slit apertures 155 and 156 are shown in order to geometrically define the areas of the light source and detector; in an actual system, the apertures can be eliminated by suitable choices of a light source and a detector.

Figure 9:
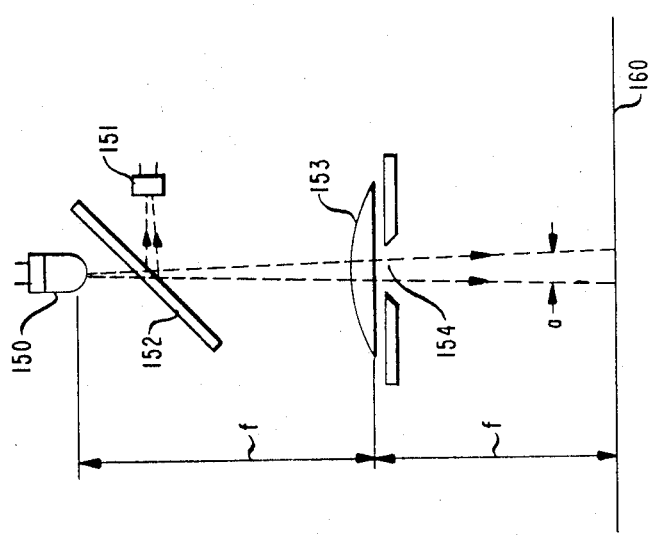

Light flux from the source 150 is gathered by the lens 153 after being partially reflected and partially transmitted by the beam splitter 152. On this first pass, the reflected light is directed to an absorbing surface and thus plays no further part in the sensor operation. Since the lamp 150 lies at the focal point of the lens 153, the light flux, after refraction by the lens, is parallel. In consequence, the light flux that falls on the card 169 is confined to a rectangular beam defined by the rectangular aperture 154—diffraction effects can be neglected. The flux that strikes the flat sections of the card is specularly and diffusely reflected back in the direction of the aperture. The specular flux gathered by the lens is reflected at a right angle by the beam splitter, comes to a focus at aperture 156 and continues on to the surface of the photodetector. As will be seen below, the diffuse flux can be minimized with respect to the specular flux. Thus, as the card is scanned, the flat areas of the card produce a constant light flux signal on the photodetector. In FIG. 9 arrows are added to show the light path taken by the sensed beam, and to show the area of the card which is thus optically scanned.

Figure 10:
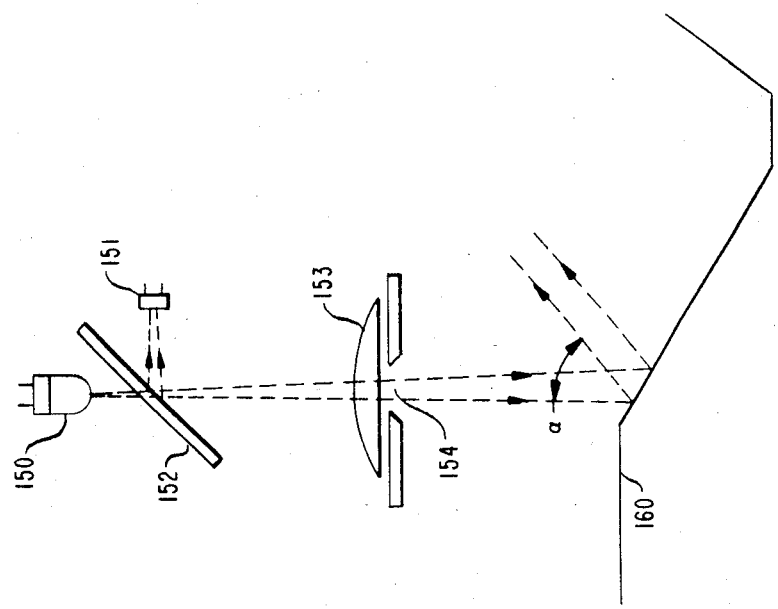

Consider now the condition illustrated in FIG. 10. In this case, the light beam falls on either the embossed characters of a front side scan or the corresponding depressions of a back side scan. Here, the specular light beam is reflected away from aperture 154, and in consequence, the specular light flux on the photodetector falls to zero. As the embossed character is scanned, its position is determined by a fall in the output of the photodetector.

It can be shown that the ratio of specular to diffuse fluxes from a flat surface is greater than $4 N^2 Rs/Rd$: where N is the effective relative aperture of the slit 154 where Rs and Rd are the specular and diffuse reflection coeffecients. In order to increase this ratio, it is simply necessary to increase N. For example, by assuming typical values of Rs=0.05 and Rd=0.6 and assuming that N=8, it follows that the ratio of specular to diffuse fluxes is greater than 20. In other words, as the specular flux falls to zero, the diffuse flux that falls on the photodetector causes a signal that is only 1/20 of its original value—the signal contrast is more than adequate for reliable reading.

An upper limit on the value of N is imposed by two considerations. First, as N increases, diffraction effects cause the area of the patch of light on the card surface to increase; eventually, this area becomes too large to fit inside the permissible scan dimensions imposed by the size of the embossed characters. Second, as N increases, eventually the sensor becomes too sensitive to minor surface imperfections in the reflecting surface of the card; the specular flux could fall to zero in the absence of an embossed character at a given position in the scan. Neither of these limitations, however, imposes a hardship on the system; considerable latitude in the value of N is allowable.

The advantages of this sensor, as opposed to the opto-mechanical one of FIG. 3, are: first, the sensor doesn't touch any part of the card, so the sensor is not subject to wear; and second, it is less expensive to produce in prototype form because no special tooling is required. The main disadvantage of this optical sensor is that its somewhat more complex output signal would require a more complex signal processing circuitry. Whereas the sensor of FIG. 3 gives a single, extremely high contrast pulse for each vertical bar, this one could produce several pulses of approximately equivalent magnitude. In order to remove possible ambiguity and correlate plural output pulses with the detection of a single embossed character stroke, a time gate may used which, for instance, would suppress any signals representative of a character bar during a time interval equal to the bar width divided by the card transport velocity, following detection of a first such signal.

Another method of removing this ambiguity would be to alter the angle between the card surface and the sensor optical axis. With a proper choice of this angle (after the necessary card measurements can be made and analyzed), it is possible to configure the optical scanner so that one and only one pulse is generated for each vertical bar scanned.

The system of this invention can be adapted to provide a security check that will operate reliably even with damage to the card and dirt on the card surface. The security number can have as many characters as is required to achieve the necessary redundancy for reliable checks. For instance, suppose that the security number in the memory for a given card consists of 10 characters; suppose later that the transmitted characters from that card fail to match some of the characters in memory; say, matches are obtained on only 5 of the characters because the embossing on the card has been damaged. Even so, 5 (or even fewer) matches indicate that the card is valid since the probability is very low that a counterfeit card would produce in the proper sequence, a phase position code number that would match this many characters. From experience, it can be simply decided how many characters and matches shall be required.

The invention is based on the observation that unique and measurable dimensional differences exist among standard embossed magnetic stripe credit cards, and that these differences would be technically difficult, and thus expensive, to replicate for the purpose of fraud; and further that such differences may be impossible to copy or predict without access to the card itself. Obviously the magnetic and optical data on credit cards held by two different individuals are measurably different. Each card contains a unique account number which is included in both the embossed character set and the encoded data set on the magnetic stripe. Two cards that contain the same information (viz, duplicate cards issued to one individual) also differ in that the precise physical location on the card of each embossed or magnetically encoded feature will be different, so that the position phase relationships between the sequence of bit data on the magnetic stripe and the embossed characters will also differ. No attempt is made by the credit card manufacturer to begin and end a magnetic data train at precise locations on the card. No attempt is made to precisely locate either the embossed characters or their relative spacing with respect to other embossed characters or the magnetically encoded data. Further, all magnetic stripe data contains random spacings called "jitter", which may be as high as ±20 percent of the nominal bit spacing. What is important to this invention is that this phase relationship for a given credit card is a unique feature which can be ascertained only from a direct testing of the particular card; which remains a constant attribute of that card; and which could be replicated, if at all, only with great difficulty.

The system is simpler than for any other system yet proposed. Once the equipment (terminals, minicomputer, controllers, and central computer file) is installed, security information on issued cards can be gathered during a period of normal card usage without interfering or complicating a normal credit transaction. This implementation process would work as follows:

1. A customer's card would be read by the terminal which would gather the usual information (identification number, credit status) together with certain security information that is unique to that particular card.

2. This information (security number) would be transmitted to the central computer.

3. Upon receipt of the security number the computer would attempt to match this number against the one in its files.

4. On the first entry of the card security number into the system, the computer would recognize it to be a new number and would store the number in memory for future use. The computer then would send back to the terminal a message which would indicate to the operator that no previous security information had been stored and that credit is to be given at the terminal operator's discretion.

5. In a fairly short period of time, security information on most of the issued cards would be gathered and then the system could be considered fully operational. Security information on new cards would be entered into the computer memory file before the card is sent to the customer. Other issued cards that customers use infrequently would eventually find their way into the system but would present no problem—the terminal operator would be alerted to the fact that this card had not been used for some time and thereby could give it special attention.

6. A slight complication arises in the system during the period when the credit card company replaces a customer's card because the customer would have in his possession two cards, both of which for a certain period of time must be recognized as valid by the system. Although the credit card company could specify that the old card would become invalid on a given cut-off date and that after this date only the new card would be accepted, there would be certain customers who would present the new card beforehand and the old card afterward—and in either case, would be irate at the system for denying his credit.

One solution to this problem is to provide two security memory positions in the central computer, one position for the old card and one for the new. During some interim period, if the security information from the card matches either of the security numbers in memory, then the card, either the old or the new one, would be accepted as valid. A month, say, after the new card is issued, the computer would be programmed to expunge from its files the security information on the old card. Thereafter, only the new card would be accepted as valid.

As is the case with familiar cards such as Zeta card, the Citicard, and the Rusco card, public knowledge of this system's details would lessen but not eliminate its effectiveness. To keep this system's existence and details secret, however, should be easier than is the case with the security cards cited above, because the cited cards contain security features that make them notably different from a standard card. In this new system, the potential counterfeiter is confronted with the problem of discovering which features of a standard card are used for the security check—then, and only then, can he proceed with the very difficult task of duplicating precisely the embossed characters (height, position, profile), the magnetic data train with its inherent random "jitter", and the exact magnetic data.

The redundancy afforded by a large number of digits implies better security and better performance of the system in the presence of damage to the card and dirt on its surface. However, a large number of digits requires a larger space in the central computer memory file and longer times to transmit the number from the terminal to the computer. Intuitively, one would think that the number of digits ought to be greater than one and less than or equal to ten.

Since a typical credit card contains ten or more digits in the account number (e.g., American Express contains 13), and since each embossed character has at least one vertical bar in the upper quadrants (some contain two), it follows that at least ten digits can be obtained on any credit card. It will be assumed arbitrarily that only ten digits are used and that subsequent digits which are fed into the microprocessor from the storage register are to be ignored.

It should be emphasized that the redundancy of the security number makes the system insensitive to damage to the card. Cards can become warped, dirty, or nicked, and the embossed characters obtained by the system will differ from those in the central memory. Even so, it is highly probable that some of the characters from the two sets will match and the reliability of the system would be unimpaired.

In order to further lessen the effect of card damage on the system, the depressions on the back side of the embossing may be sensed rather than raised surfaces. Whereas the raised letters on the front side of the card are subject to damage from normal usage, it is unlikely that the indentations on the back side would be affected by anything short of intentional alteration. The optomechanical reading system described in connection with FIG. 3 could be used both for front and back side sensing of the embossed character positions.

It will be appreciated that the foregoing illustrative examples describe the phase position security coding method of the invention as applied to magnetic stripe data and to physically embossed features on a card. However the operative principal of the invention is to authenticate a card by generating a code from two pulse trains representative of two simultaneously-read patterns on the card. It is envisaged (but not necessary) that one pattern will generally be the magnetically-encoded identification data on a magnetic stripe, as the bit density of such data permits the generation of highly distinctive phase position codes. Also, while the invention has been described as using the embossed characters as the second pattern, it is not necessary that the second pattern even comprise individual identification data, but only that it be a measurable pattern, physically located on the card, whose elements bear no predictable phase positional relation to the other data pattern. Thus, if the printed graphic design appearing on a card is erratically located with respect to the edges of the card, or to the registration points, if any, used for writing the first data pattern, such a printed design may serve as the second pattern. Other variations of the invention will occur to those skilled in the art.

Accordingly the invention is limited only by the following claims.

What is claimed is:

1. a credit card security system for a card bearing data embodies in first and second forms on first and second tracks respectively, such system comprising:
    reader means for simultaneously sensing said data in said first and second forms, wherein said first and second forms are magnetic representations on a magnetic stripe and embossed representations respectively, and for producing first and second signal trains representative of said data in said first and second forms respectively, so that the first and second signal trains have a unique phase relationship therebetween characteristic of the physical location of the data embodies in said card; and
    means responsive to said first and second signal trains for generating a code representative of said characteristic phase relationship.

2. A system according to claim 1, further including means for comparing said code to a security code stored in a central file, said security code being previously generated from the same card and being representative of the phase relationship between the data in said first and second forms on the card.

3. A system in accordinance with claim 2, wherein said reader includes means responsive to said magnetic representation for generating said first signal train.

4. A system in accordance with claim 2, wherein said reader includes means responsive to said embossed representations for generating said second signal train.

5. A system in accordance with claim 4, wherein said means responsive to said embossed representation includes opto-mechanical means for selectively interrupting a light path in response to a physical change in the surface of said card, such opto-mechanical means further comprising first and second fingers pivotable about a common axis and spaced apart along the axis of movement of said card a distance less than the length of an embossed character along said axis of movement.

6. A system in accordance with claim 5, wherein said opto-mechanical means comprises a source of light and a detector, and said first and second fingers each include a window adapted to pass light to said detector only when the windows are aligned.

7. A system in accordance with claim 4, wherein said means responsive to the embossed representations includes:
    slit defining means;
    a light source for directing an image of said slit on the surface of the card; and
    means for detecting a change in contour of the surface of said card by detecting a change in the intensity of the reflected image.

8. A system in accordance with claim 7 including a beam splitter and second and third slit forming members outside the optical path from the source to the detector and oriented to pass the image of the slit only when reflected from said card surface at a prescribed angle; said second and third slit forming members being placed adjacent the surface of said card and adjacent said detector respectively so that changes in contour of the surface of said card cause reflection of said image at an angle different from said prescribed angle.

9. A method of generating a security code for a card bearing data written in a first form in a first physical location on the card and data written in a second form in a second physical location on the card, such method comprising the steps of:
    sensing first features of the data written in the first form and generating a pulse train representative of such sensed first features;
    simultaneously sensing second features of the data written in the second form, wherein the data written in the second form is alphanumeric data written in embossed characters, and generating a pulse train representative of such sensed second features; and
    comparing the phase relationships of said first and second pulse trains to define a security code, so that the code is determined both by the data written in the first and second forms, and by the locations of the data on the card.

10. A method according to claim 9, wherein the data written in the first form is magnetically written data on a magnetic stripe.

11. A method according to claim 10, wherein the step of simultaneously sensing features of the data written in the second form includes the step of moving the card past a light source and a photodetector arranged so that the intensity of light reaching the photodector is caused to vary by the change in surface contour of the card at the embossed characters, and wherein the step of generating a pulse train representative of such sensed second features includes the step of generating a pulse train in accordance with the variation of light intensity reaching the photodetector.

12. A method according to claim 11 wherein the step of comparing the phase relationships to define a security code includes the step of examining a predetermined number of pulses of said first pulse train following each pulse of said second pulse train so as to define the security code.

* * * * *